US009671496B2

(12) United States Patent
Stapleton

(10) Patent No.: US 9,671,496 B2
(45) Date of Patent: Jun. 6, 2017

(54) INDOOR LOCALIZATION USING DIGITAL OFF-AIR ACCESS UNITS

(71) Applicant: DALI SYSTEMS CO. LTD., George Town, Grand Cayman (KY)

(72) Inventor: Shawn Patrick Stapleton, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 552 days.

(21) Appl. No.: 14/168,328

(22) Filed: Jan. 30, 2014

(65) Prior Publication Data

US 2014/0313075 A1 Oct. 23, 2014

Related U.S. Application Data

(60) Provisional application No. 61/759,229, filed on Jan. 31, 2013.

(51) Int. Cl.
*G01S 19/01* (2010.01)
*G01S 19/11* (2010.01)

(52) U.S. Cl.
CPC ............ *G01S 19/01* (2013.01); *G01S 19/11* (2013.01)

(58) Field of Classification Search
CPC ................................. G01S 19/01; G01S 19/11
USPC ...................................................... 342/357.39
See application file for complete search history.

(56) References Cited

U.S. PATENT DOCUMENTS

| 2004/0102196 A1* | 5/2004 | Weckstrom | H04W 64/00 455/456.1 |
|---|---|---|---|
| 2007/0200757 A1 | 8/2007 | Homiller et al. | |
| 2011/0177827 A1 | 7/2011 | Crilly, Jr. et al. | |
| 2013/0322884 A1* | 12/2013 | Schmidt | H04B 10/1129 398/115 |
| 2014/0155095 A1* | 6/2014 | Albanes | H04W 4/22 455/456.3 |

FOREIGN PATENT DOCUMENTS

WO WO 2012/024345 A2 2/2012

OTHER PUBLICATIONS

Notification of Transmittal of the International Search Report and the Written Opinion of the International Searching Authority, or the Declaration and International Search Report and Written Opinion of the International Searching Authority for International Application No. PCT/US2014/013846 mailed on May 12, 2014, 9 pages.

(Continued)

*Primary Examiner* — Harry Liu
(74) *Attorney, Agent, or Firm* — Kilpatrick Townsend & Stockton LLP

(57) ABSTRACT

A system for indoor localization using satellite navigation signals in a Distributed Antenna System includes a plurality of Off-Air Access Units (OAAUs). Each of the plurality of OAAUs is operable to receive an individual satellite navigation signal from at least one of a plurality of satellites and operable to route signals optically to one or more DAUs. The system also includes a plurality of remote DRUs located at a Remote location. The plurality of remote DRUs are operable to receive signals from a plurality of the one or more DAUs. The system further includes an algorithm to delay each individual satellite navigation signal for providing indoor localization at each of the plurality of DRUs.

19 Claims, 13 Drawing Sheets

(56) References Cited

OTHER PUBLICATIONS

International Preliminary Report on Patentability for International Application No. PCT/US2015/013846 mailed on Aug. 13, 2015, 8 pages.

* cited by examiner

INDOOR LOCALIZATION USING DIGITAL OFF-AIR ACCESS UNITS

CROSS-REFERENCES TO RELATED APPLICATIONS

This application claims priority to U.S. Provisional Patent Application No. 61/759,229, filed on Jan. 31, 2013, entitled "Indoor Localization Using Digital Off-Air Access Units," the disclosure of which is hereby incorporated by reference in its entirety for all purposes.

BACKGROUND OF THE INVENTION

Global Positioning System (GPS) technologies, initially utilized by military organizations, including the U.S. Department of Defense, have now achieved widespread use in civilian applications. The widespread availability of GPS has enabled the provision of many location-based services, providing location information for mobile devices.

Although GPS provides high accuracy in positioning when outdoors, the GPS signal may not be received with sufficient strength and from enough satellites when a user is inside a building or structure. An indoor positioning system (IPS) is a network of devices used to locate objects or people inside a building. Currently, no standard for an IPS has been adopted in a widespread manner, adversely impacting deployment.

An IPS typically relies on anchors with known positions rather than relying on satellites, since satellite signals are not typically available at indoor positions as a result of signal attenuation resulting from roofs and other building structures. Despite the progress made in IPS design and implementation, there is a need in the art for improved methods and systems related to indoor localization.

SUMMARY OF THE INVENTION

The present invention generally relates to wireless communication systems employing Distributed Antenna Systems (DAS) as part of a distributed wireless network. More specifically, the present invention relates to a DAS utilizing a digital Off-Air Access Unit (OAAU). In a particular embodiment, the present invention has been applied to receive GPS signals at the OAAUs that can be configured in a star configuration or a daisy chained configuration. The methods and systems described herein are applicable to a variety of communications systems including systems utilizing various communications standards.

Satellite navigation systems, including the Global Positioning System (GPS) have received widespread use in many applications such as traffic management, navigation, medical emergency services as well as location based services for handsets. GPS is discussed herein as an exemplary satellite navigation system, although other systems, including GLONASS (Russian), Galileo (Europe), QZSS (Japanese), and BeiDou (Chinese) are included within the scope of the present invention and should be understood to fall under the umbrella of systems collectively referred to as GPS herein. Although GPS positioning is prevalent in outdoor applications, indoor localization using GPS is not common because of the large signal attenuation caused by the building walls. Most indoor positioning solutions require unique infrastructure that is complicated and expensive to deploy. The indoor positioning architecture provided by embodiments of the present invention uses the existing GPS Satellite infrastructure and can be used with standard handsets that contain GPS receivers.

A distributed antenna system (DAS) provides an efficient means of distributing signals over a given geographic area. The DAS network comprises one or more digital access units (DAUs) that function as the interface between the Off-Air Access Units (OAAU) and the digital remote units (DRUs). The DAUs can be collocated with the Off-Air Access Units (OAAU). Under certain embodiments, the Off-Air Access Units may not be collocated with the DAUs. Off-Air Access Units can be used to relay GPS Satellite signals to one or more DAUs. Under certain embodiments the Off-Air Access Units may relay the GPS signals directly to one or more Digital Remote Units (DRUs). One or more Off-Air Access Units can be used to communicate with one or more Satellites. The Off-Air Access Units relay the RF GPS signals between the Satellite and the coverage area.

According to an embodiment of the present invention, s system for indoor localization using satellite navigation signals in a Distributed Antenna System is provided. The system includes a plurality of Off-Air Access Units (OAAUs). Each of the plurality of OAAUs is operable to receive an individual satellite navigation signal from at least one of a plurality of satellites and operable to route signals optically to one or more DAUs. The systems also includes a plurality of remote DRUs located at a Remote location. The plurality of remote DRUs are operable to receive signals from a plurality of local DAUs. The system further includes an algorithm to delay each individual satellite navigation signal for providing indoor localization at each of the plurality of DRUs.

According to an embodiment of the present invention, a system for indoor localization using satellite navigation signals in a Distributed Antenna System is provided. The system includes a plurality of Off-Air Access Units (OAAUs), each of the plurality of OAAUs being operable to receive an individual satellite navigation signal from at least one of a plurality of satellites and operable to route signals optically to one or more DAUs. The system also includes a plurality of remote DRUs located at a Remote location. The plurality of remote DRUs are operable to receive signals from a plurality of the one or more DAUs. The system further includes an algorithm to delay each individual satellite navigation signal for providing indoor localization at each of the plurality of DRUs.

According to another embodiment of the present invention, a system for indoor localization using GPS signals in a Distributed Antenna System is provided. The system includes a plurality of Off-Air Access Units (OAAUs), connected together via a daisy chain configuration, and operable to receive a GPS signal transmitted by at least one of a plurality of GPS satellites, and operable to route signals optically to one or more DAUs. The system also includes a plurality of remote DRUs located at a Remote location. The plurality of remote DRUs are operable to receive signals from the one or more DAUs. The system further includes an algorithm to delay each individual GPS satellite signal for providing indoor localization at each of the plurality of remote DRUs.

According to a specific embodiment of the present invention, a system for indoor localization using GPS signals in a Distributed Antenna System is provided. The system includes a plurality of Multiple Input Off-Air Access Units (MIOAAUs), each receiving a GPS signal from at least one of a plurality of GPS satellites and at least one DAU in communication with the plurality of MIOAAUs. The system also includes a plurality of remote DRUs, each of the plurality of remote DRUs being operable to receive signals from the at least one DAU and a delay system coupled to the plurality of remote DRUs and operable to delay the GPS satellite signal for each of the plurality of MIOAAUs.

According to a specific embodiment of the present invention, a system for indoor localization using GPS signals in a Distributed Antenna System is provided. The system includes a plurality of satellites, each transmitting a GPS signal, and a plurality of Off-Air Access Units (OAAUs), receiving at least one of the plurality of GPS satellites, and operable to route signals directly to one or more DRUs.

According to another specific embodiment of the present invention, a system for indoor localization using GPS signals in a Distributed Antenna System is provided. The system includes a plurality of satellites, each transmitting a GPS signal and a plurality of Off-Air Access Units (OAAUs), receiving at least one of the plurality of GPS satellites, and operable to route signals optically to one or more DAUs. The system also includes a plurality of remote DRUs located at a Remote location. The plurality of remote DRUs are operable to receive signals from a plurality of local DAUs. The system further includes a de-multiplexer to extract one of the GPS satellite signal's and time delay it at each DRU and an algorithm for determining the delay at each of the plurality of DRUs to provide indoor localization.

According to an embodiment of the present invention, a system for indoor localization using satellite navigation signals in a Distributed Antenna System is provided. The system includes a plurality of Off-Air Access Units (OAAUs), each of the plurality of OAAUs operable to receive an individual satellite navigation signal from at least one of a plurality of satellites and operable to route signals optically to one or more DAUs. The satellite navigation signals may be associated with one of several systems, including GPS, GLONASS, Galileo, QZSS, or BeiDou. The system also includes a plurality of Off-Air Access Units (OAAUs). Each of the plurality of OAAUs is operable to receive the individual satellite navigation signal from at least one of the plurality of satellites and operable to route signals optically to one or more DAUs. The system further includes a plurality of remote DRUs located at a Remote location. The plurality of remote DRUs are operable to receive signals from a plurality of local DAUs. Moreover, the system includes an algorithm to delay each individual satellite navigation signal for providing indoor localization at each of the plurality of DRUs.

Numerous benefits are achieved by way of the present invention over conventional techniques. Traditionally, an Off-Air GPS Repeater communicates with the satellite via a wireless RF signal and communicates with the coverage area via a wireless RF signal. Off-Air GPS repeaters broadcast the GPS Satellite signal indoors, which provides the GPS Handset receiver with the position of the Off-Air Repeater. In some embodiments, no additional intelligence is used to provide any positional information for the location of the indoor user relative to the Off-Air Repeater. An Off-Air Access Unit (OAAU) relays the GPS signals to a DAU via an optical cable. The GPS signals from the Off-Air Access Unit are transported digitally over an optical cable to one or more DAUs or directly to one or more Digital Remote Units (DRU). Transporting the Off-Air Access Unit signals optically provides an additional benefit of enabling time multiplexing of multiple GPS signals from multiple Off-Air Access Units. Additionally, embodiments enable the routing of the Off-Air Access Unit signals to one or more remote locations. Utilizing multiple GPS signals from multiple OAAUs can provide enhanced indoor localization accuracy.

These and other embodiments of the invention along with many of its advantages and features are described in more detail in conjunction with the text below and attached figures.

DETAILED DESCRIPTION OF SPECIFIC EMBODIMENTS

A distributed antenna system (DAS) provides an efficient means of transporting signals between local units and remote units. The DAS network comprises one or more digital access units (DAUs) that function as the interface between the Off-Air Access Units (OAAU) and the digital remote units (DRUs). The DAUs can be collocated with the Off-Air Access Units (OAAU). The DRUs can be daisy chained together and/or placed in a star configuration and provide coverage for a given geographical area. The DRUs are typically connected with the DAUs by employing a high-speed optical fiber link. This approach facilitates transport of the RF signals from the Off-Air Access Units (OAAU) to a remote location or area served by the DRUs.

Off-Air Access Units communicate with one of more GPS Satellites over the air. Off-Air Access Units are convenient for relaying GPS signals between locations that are not well covered by the GPS Satellite itself. A typical Off-Air Access Unit receives the Downlink RF GPS signal from a Satellite, amplifies and filters the RF signal and transports it to a DRU for a given coverage area. Each Off-Air Access Unit utilizes a directional antenna to communicate with a distinct subset of GPS Satellites. Typically, a minimum of 3 GPS Satellites are used to triangulate and determine the receiver's position. The relative time-delays between the 3 GPS Satellites provide a means of identifying the 2D position of the receiver. 4 GPS Satellite signals will provide 3D localization of the receiver. Directional antennas are used at the Off-Air Access Units in order to separate the 3 or more Satellite signals. Each GPS Satellite signal will be time multiplexed in a data transport frame structure and sent to the remote DRUs. It is assumed that the DRUs position is known a-priori. The DRU's will receive the independent GPS satellite signals, which are independently time-delayed, for example, by a user, in order to replicate the GPS position of the DRUs. The GPS positional information of each DRU can be determined from a 3D map of the given indoor venue. One embodiment of the present invention enables a GPS receiver to be incorporated in both the DRU as well as the Off-Air Access Units. The absolute GPS position of the DRUs can be obtained be using the Off-Air Access unit GPS position information and then adjusting it to the 3D position offset inside the venue (e.g., $4^{th}$ floor, 30 m North, 10 m West). Locating a GPS receiver at the DRU will provide a feedback mechanism of insuring the accuracy of the user-established time-delays in some embodiments.

Figure 1:
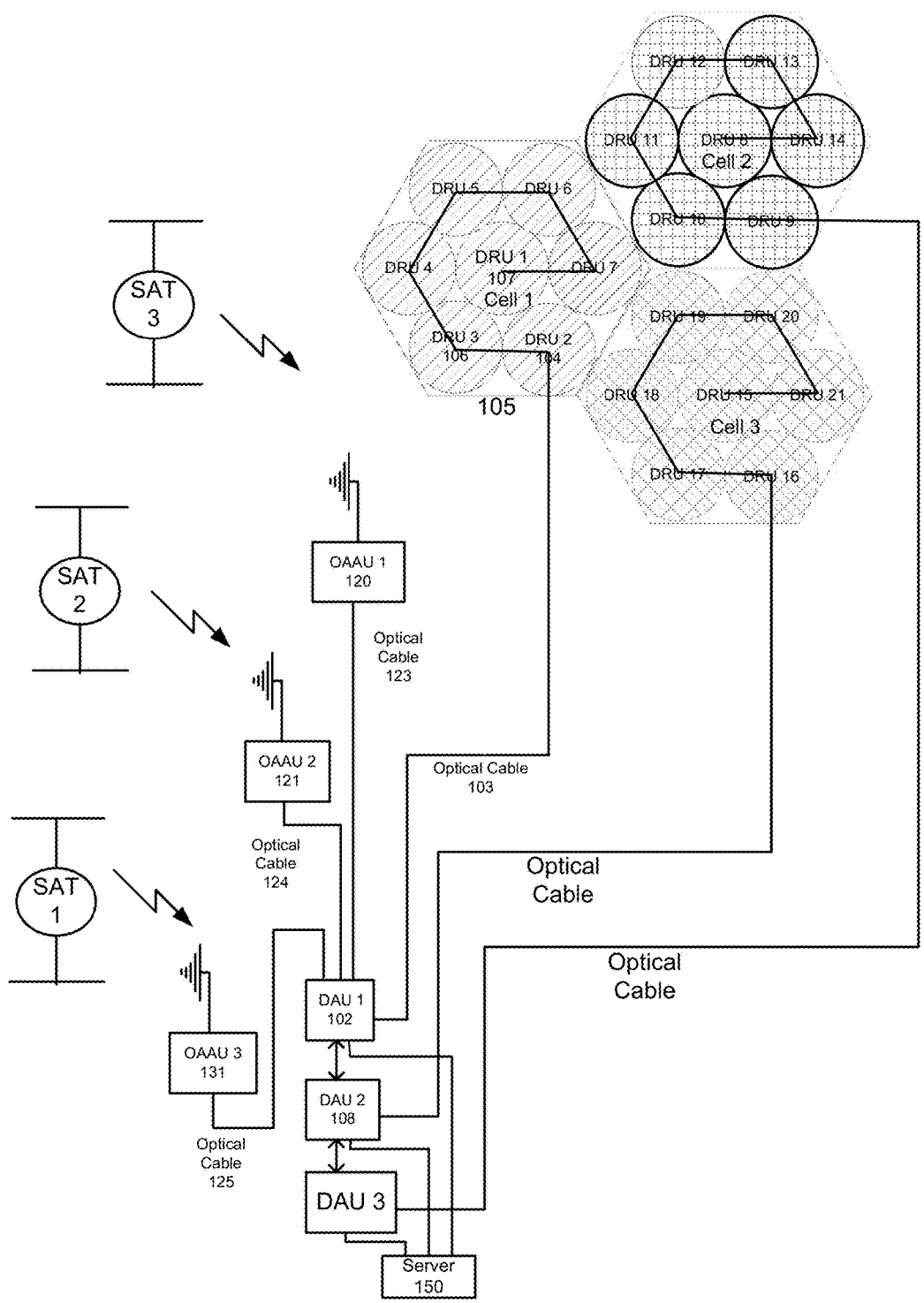
FIG. 1 is a block diagram showing the basic structure and an example of the transport routing based on having a 3 GPS satellites with 3 Digital Access Units (DAUs) at a local location, 3 Off-Air Access Units (OAAUs) at a local location and Digital Remote Units (DRUs) at a remote location according to an embodiment of the present invention. In this embodiment, 3 OAAUs are connected to a DAU at the local location.

FIG. 1 illustrates a DAS network architecture according to an embodiment of the present invention and provides an example of a data transport scenario between 3 GPS Satellites, multiple Off-Air Access Units (OAAUs), multiple local DAUs, and multiple DRUs. GPS Satellites 1, 2 and 3 are connected to OAAU 1 (120), OAAU 2 (121), and OAAU 3 (131), respectively, by wireless links in the illustrated embodiment. DAUs 1 (102), (108) and DAU 3 route the Off-Air Access Unit signals to the various DRUs. Each of the local DAUs is connected to server (150). In this embodiment, the OAAUs are connected in a star configuration with DAU (102) using optical cables (i.e., optical fibers). Although three satellites are illustrated in FIG. 1, the illustrated three satellites are shown merely as an example and it will be appreciated that additional satellites (e.g., 4, 5, or more satellites) in the constellation can be utilized by embodiments of the present invention. In the following figures, three exemplary satellites are illustrated, but the embodiments illustrated in the following figures are not limited to the use of only three satellites. One of ordinary skill in the art would recognize many variations, modifications, and alternatives.

One feature of embodiments of the present invention is the ability to route the GPS Satellite signals among the DAUs and DRUs. In order to route GPS signals available from one or more Satellites, it is desirable to configure the individual router tables of the DAUs and DRUs in the DAS network. This functionality is provided by embodiments of the present invention.

The DAUs are networked together to facilitate the routing of signals among multiple DAUs. This architecture enables the various GPS Satellite signals to be transported simultaneously to and from multiple DAUs. PEER ports are used for interconnecting DAUs in some implementations.

The DAS network can include a plurality of OAAUs, DAUs and DRUs. The DAU communicates with the network of DRUs and the DAU sends commands and receives information from the DRUs. The DAUs include physical nodes that accept and deliver RF signals and optical nodes that transport data. A DAU can include an internal server or an external server. The server is used to archive information in a database, store the DAS network configuration information, and perform various data related processing among other functions.

Additionally, the OAAU communicates with the DAU. The OAAU receives commands from the DAU and delivers information to the DAU. The OAAUs include physical nodes that accept GPS RF signals and optical nodes that transport data.

Figure 2A:
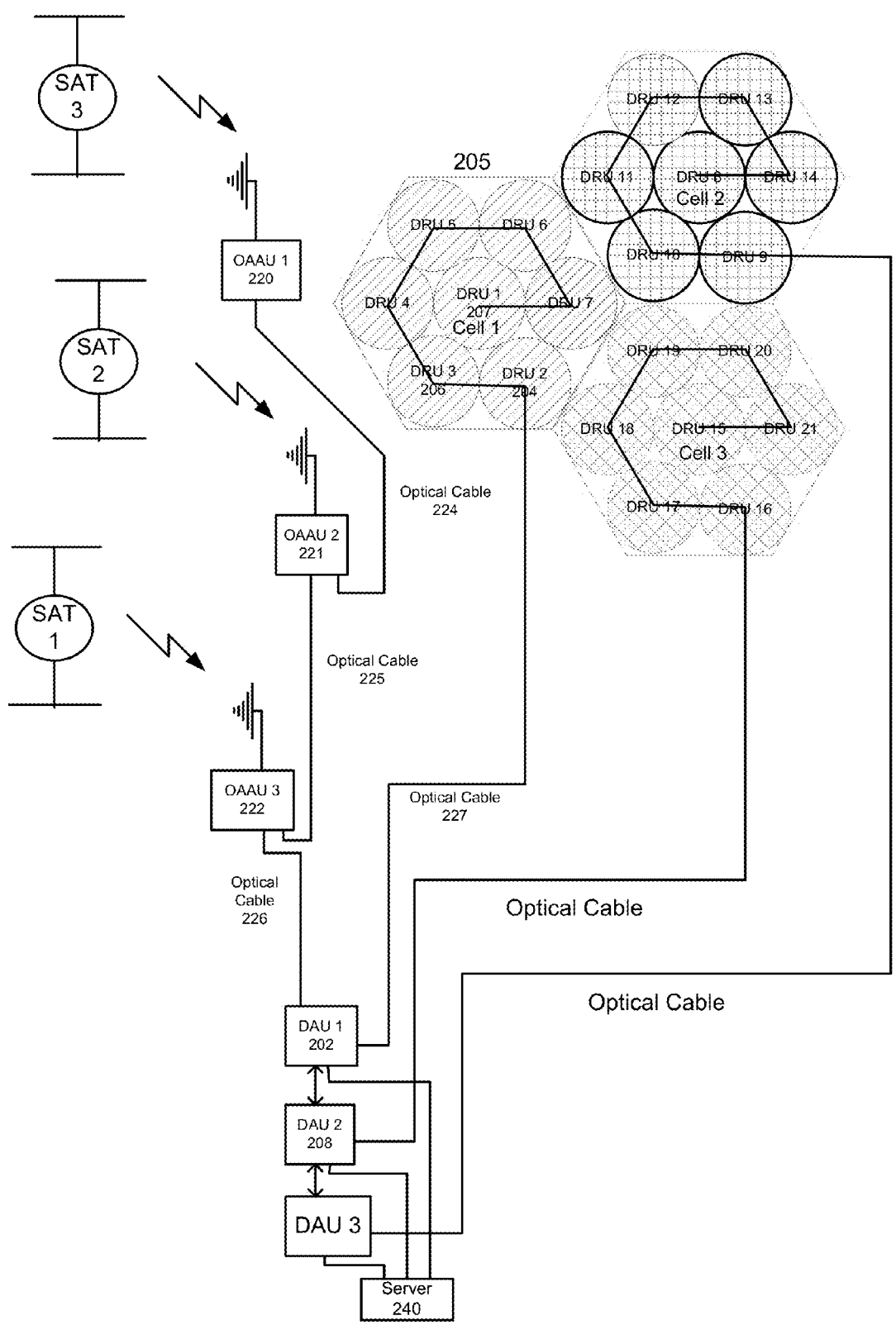
FIG. 2A is a block diagram showing the basic structure and an example of the transport routing based on having a 3 Satellites with 3 DAUs at a local location, 3 OAAUs daisy chained together at a local location and optical interfaces to DRUs at the remote locations according to an embodiment of the present invention.
Figure 2B:
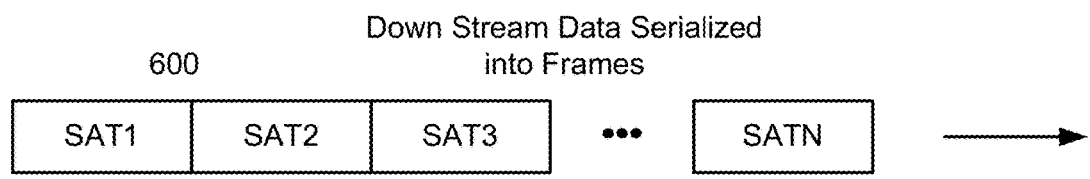
FIG. 2B shows the data transport structure whereby the various Satellite GPS signals are time-multiplexed into a frame according to an embodiment of the present invention.

As shown in FIG. 2A, the individual GPS signals from Satellites SAT 1, SAT 2 and SAT 3 are transported to a daisy-chained network of OAAUs. FIG. 2 demonstrates how three independent Satellites, each Satellite communicating with an independent OAAU, provide input into a single DAU (202). A server (240) is utilized to control the routing function provided in the DAS network. Referring to FIG. 2A and merely by way of example, DAU 1 (202) receives downlink GPS signals from the daisy-chained network of OAAUs (220, 221, 222). OAAU 1 (220) translates the RF signals to optical signals for the downlink. The optical fiber cable (224) transports the SAT 1 signals between OAAU 1 (220) and OAAU 2 (221). The optical signals from OAAU 1 (220) and OAAU 2 (221) are multiplexed on optical fiber (225). The other OAAUs in the daisy chain are involved in passing the optical signals onward to DAU 1 (202). DAU 1 (202) DAU 2 and DAU 3 transport the optical signals to and from the network of DRUs. As shown in FIG. 2B, the various GPS signals from the Satellites are time multiplexed into a data stream for transporting throughout the DAS network. Another embodiment of the present invention includes the use of RF connections between the OAAUs and the DAUs. In this embodiment the OAAU will receive the RF signals from the GPS Satellite and transport the RF signal to a DAU using an RF cable.

Figure 3:
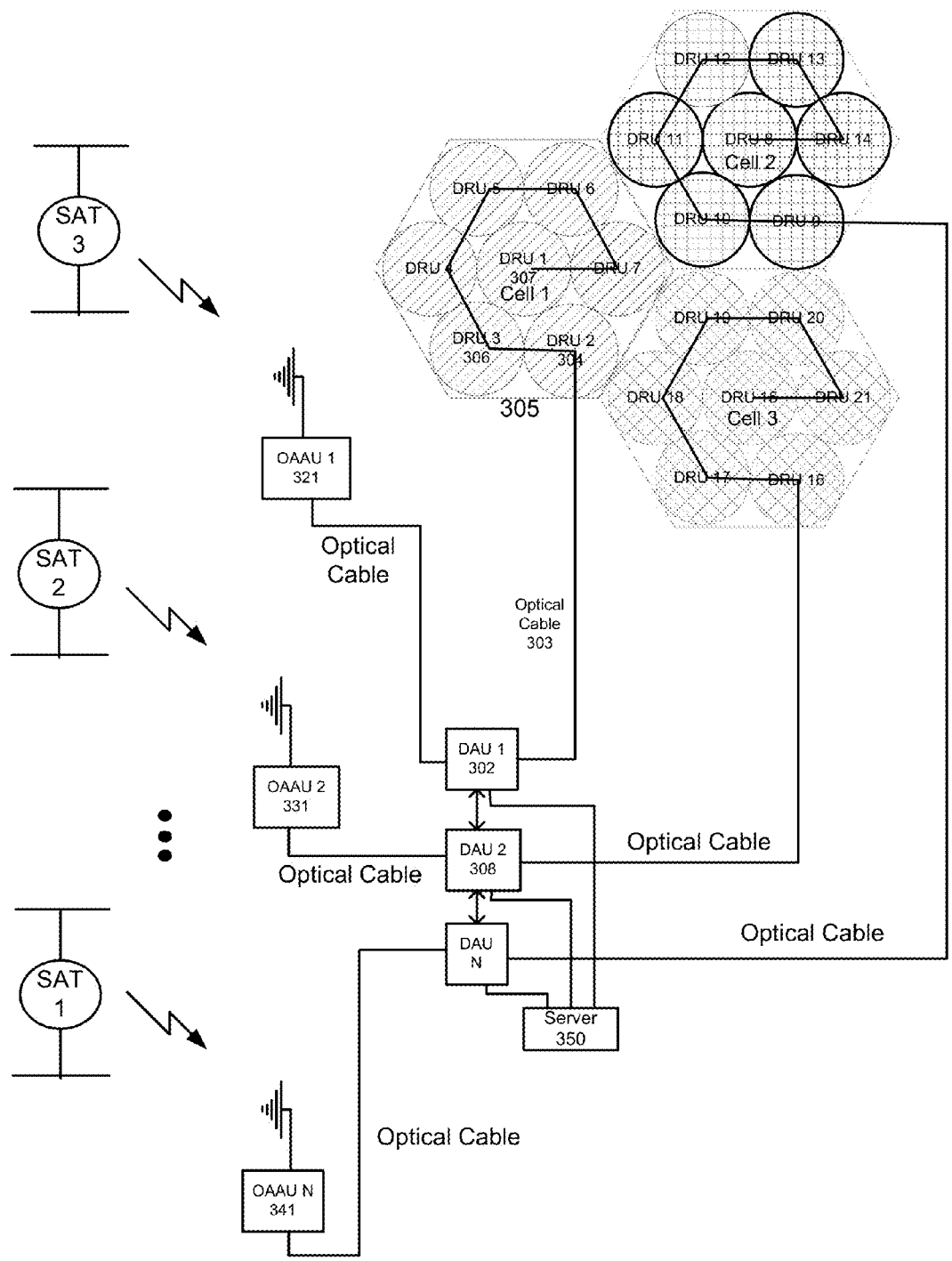
FIG. 3 is a block diagram showing the basic structure and an example of the transport routing based on having multiple OAAUs at local locations with multiple DAUs at a local location, and multiple Digital Remote Units (DRUs) at a remote location and optical interfaces to the Remotes according to an embodiment of the present invention.

FIG. 3 depicts a DAS system employing multiple Off-Air Access Units (OAAUs) at the local location and multiple Digital Remote Units (DRUs) at the remote location. In accordance with the illustrated embodiment, each DRU provides unique information associated with each DRU, which uniquely identifies data received by a particular Digital Remote Unit. In this embodiment, the individual OAAUs are independently connected to DAUs. Another embodiment of the present invention includes the use of RF connections between the OAAUs and the DAUs. In this alternative embodiment the OAAU will receive the RF signals from the GPS Satellite and transport the RF signal to a DAU using an RF cable.

The servers illustrated herein, for example, server (350) provide unique functionality in the systems described herein. The following discussion related to server (350) may also be applicable to other servers discussed herein and illustrated in the figures. Server (350) can be used to set up the switching matrices to allow the routing of signals between the remote DRUs. The server (350) can also store configuration information, for example, if the system gets powered down or one DRU or OAAU goes off-line and then you power up the system, it will typically need to be reconfigured. The server (350) can store the information used in reconfiguring the system and/or the DRUs, OAAUs or DAUs.

Figure 4:
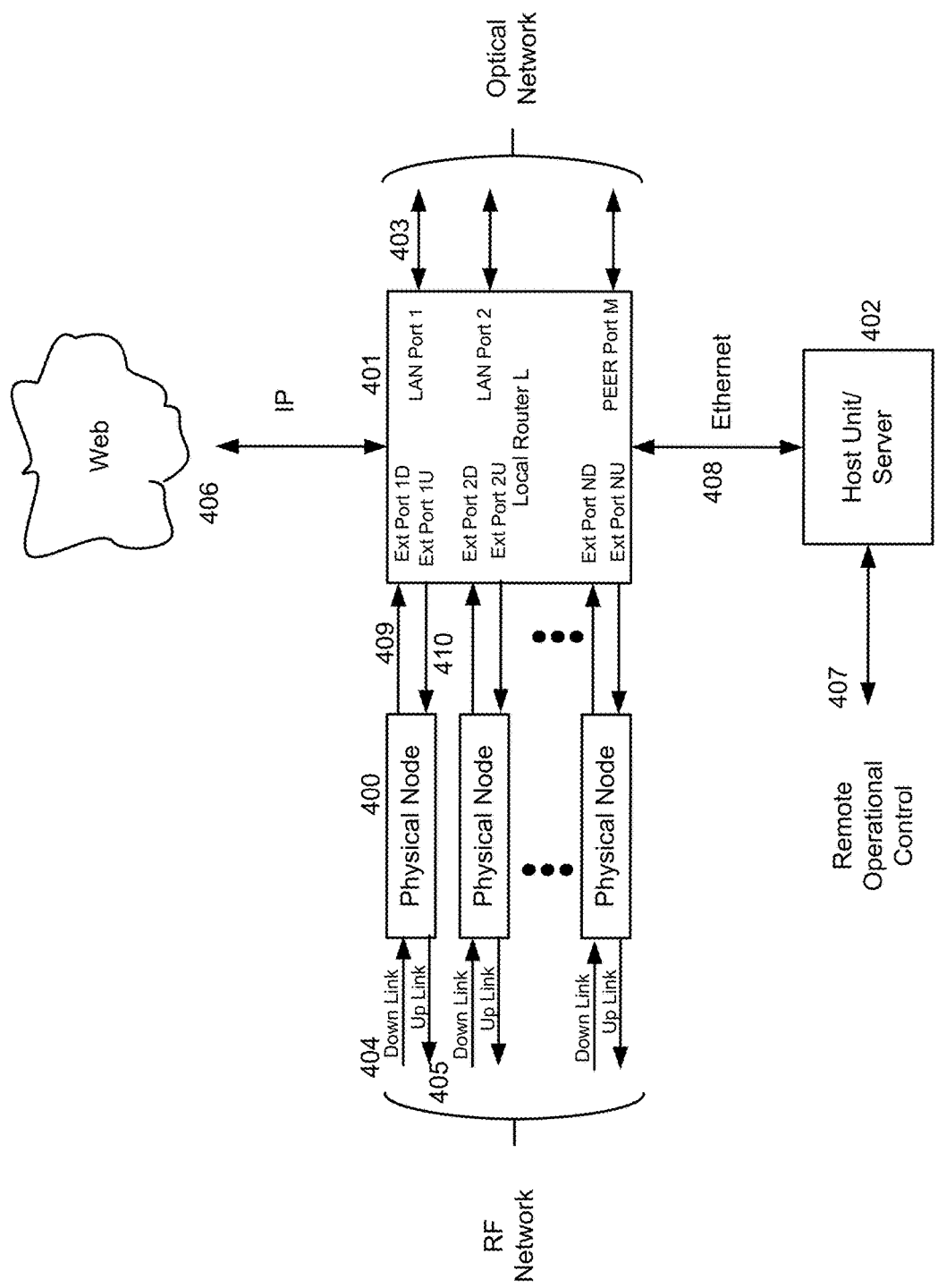
FIG. 4 is a block diagram illustrating a DAU, which contains physical Nodes and a Local Router, according to an embodiment of the present invention.

FIG. 4 shows two of the elements in a DAU, the Physical Nodes (400) and the Local Router (401). The Physical Nodes translate the RF signals to baseband for the Downlink. The local Router directs the traffic between the various LAN Ports, PEER Ports and the External Ports. The physical nodes can connect to the OAAUs at radio frequencies (RF). The physical nodes can be used for different Satellite connections.

FIG. 4 shows an embodiment whereby the physical nodes have separate inputs for the downlink paths (404). The physical node translates the signals from RF to baseband for the downlink path. The physical nodes are connected to a local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and OAAUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU and OAAU can also connect directly to the Remote Operational Control center (407) via the Ethernet port.

Figure 5:
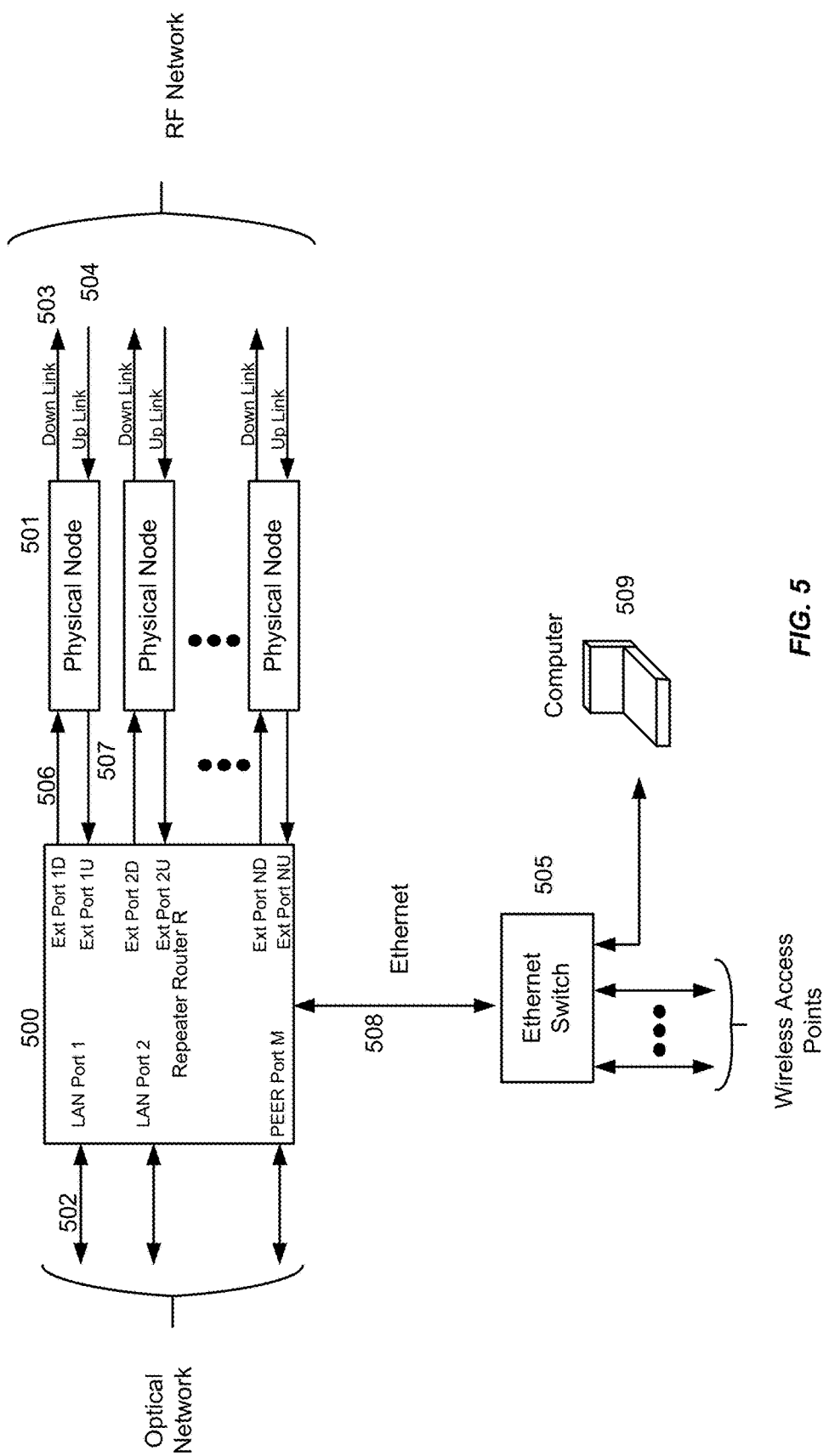
FIG. 5 is a block diagram illustrating a Off-Air Access Unit (OAAU), which contains physical Nodes and a repeater router, according to an embodiment of the present invention.

FIG. 5 shows two of the elements in a OAAU, the Physical Nodes (501) and the Repeater Router (500). The OAAU includes both a Repeater Router and Physical Nodes. The Repeater Router directs the traffic between the LAN ports, External Ports and PEER Ports. The physical nodes connect wirelessly to the GPS Satellite at radio frequencies (RF). The physical nodes can be used for different Satellites, different antennas, etc. FIG. 5 shows an embodiment whereby the physical nodes have separate outputs for the downlink paths (503). The physical node translates the signals from RF to baseband for the downlink path. The physical nodes are connected to a Repeater Router via external ports (506,507). The router directs the downlink data stream from the LAN and PEER ports to the selected External D ports. The OAAU also contains an Ethernet Switch (505) so that a remote computer or wireless access points can connect to the internet.

Figure 6:
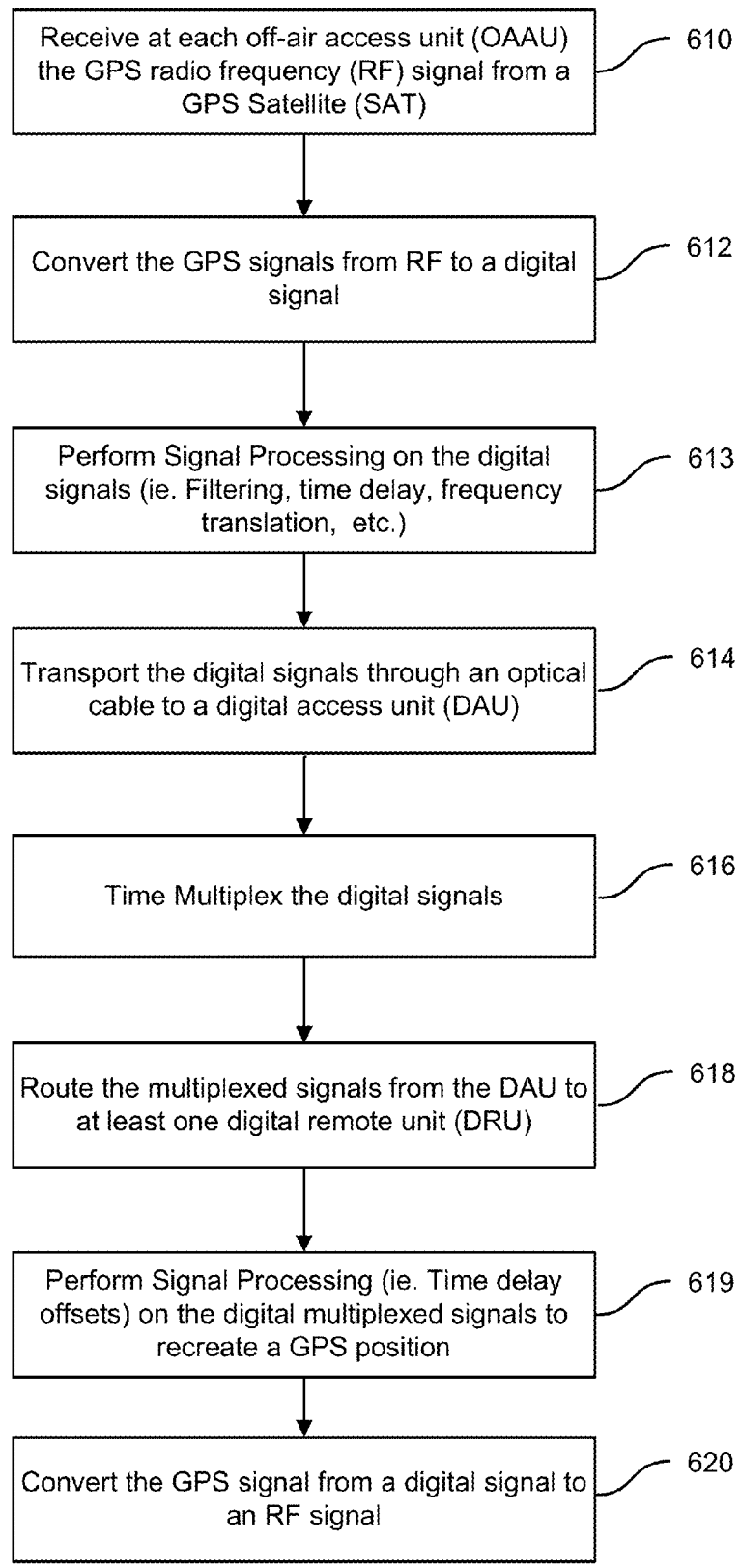
FIG. 6 is a simplified flowchart illustrating the data flow structure between the Off-Air Access Unit (OAAU) and the DAU or another RDU according to an embodiment of the present invention.

FIG. 6 is a simplified flowchart illustrating a method of routing GPS signals from the various Satellites to each DRU according to an embodiment of the present invention. As shown in block (619), the time multiplexed GPS signals from the respective Satellites are time delay offset to replicate the GPS position of the respective DRU. The DRU then broadcasts the GPS signal for detection by the users equipment.

Figure 7:
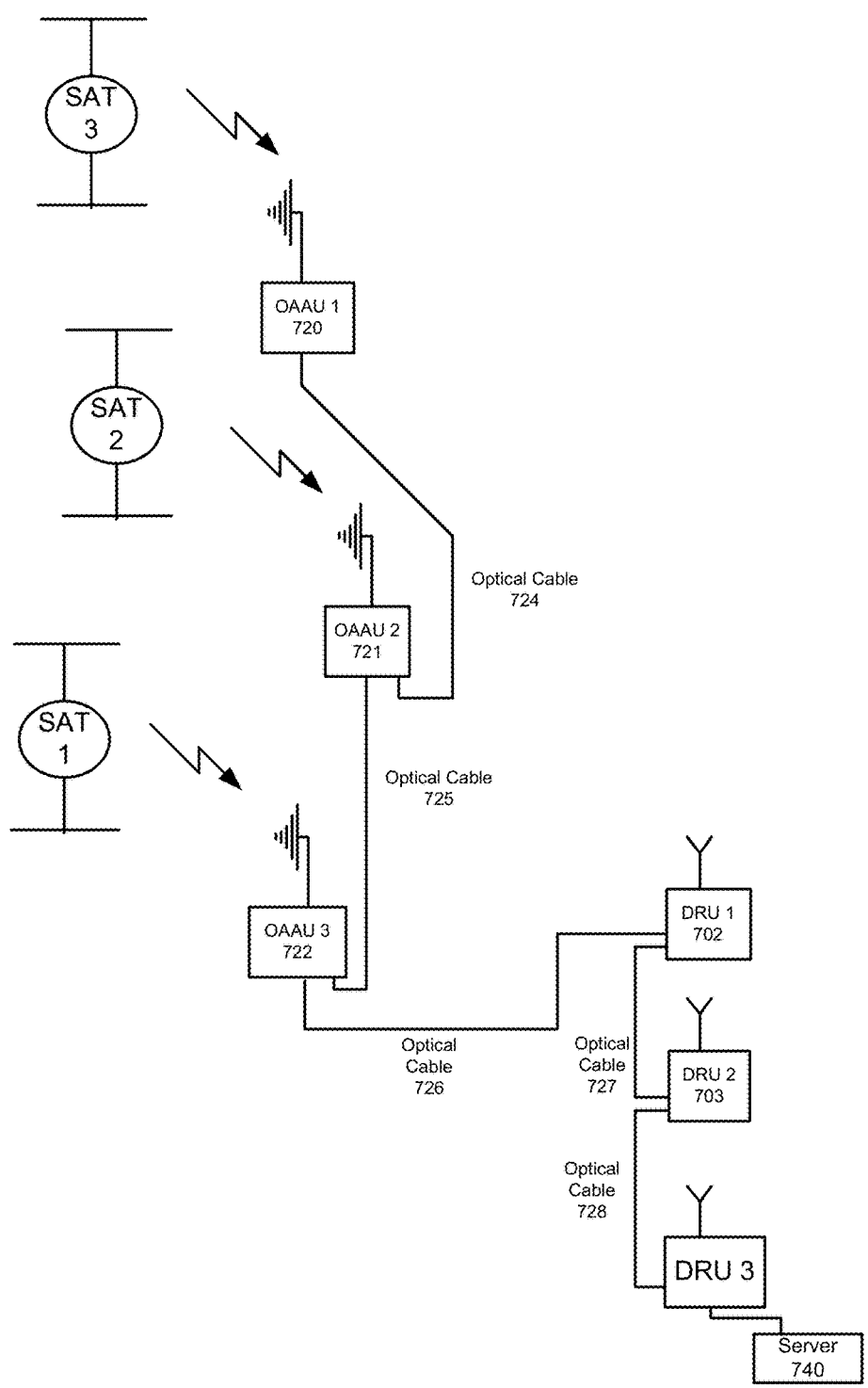
FIG. 7 is a block diagram showing the basic structure and an example of the transport routing based on having multiple OAAUs at local locations with multiple Digital Remote Units (DRUs) at a remote location and optical interfaces to the Remotes according to an embodiment of the present invention.

FIG. 7 is a block diagram showing the basic structure and an example of the transport routing based on having multiple OAAUs at local locations with multiple Digital Remote Units (DRUs) at a remote location and optical interfaces to the Remotes according to an embodiment of the present invention. As shown in FIG. 7, the individual GPS signals from Satellites SAT 1, SAT 2 and SAT 3 are transported to a daisy-chained network of OAAUs. Although three satellites are illustrated in FIG. 7 and other figures herein, the present invention is not limited to this particular number and additional satellites can be utilized as appropriate to the particular application. One of ordinary skill in the art would recognize many variations, modifications, and alternatives.

FIG. 7 demonstrates how three independent Satellites, each Satellite communicating with an independent OAAU, provide input into a single DRU (702). A server (740) is utilized to control the routing function provided in the DAS network. Referring to FIG. 7 and merely by way of example, DRU 1 (702) receives downlink GPS signals from the daisy-chained network of OAAUs (720, 721, 722). OAAU 1 (720) translates the RF signals to optical signals for the downlink. The optical fiber cable (724) transports the SAT 1 signals between OAAU 1 (720) and OAAU 2 (721). The optical signals from OAAU 1 (720) and OAAU 2 (721) are multiplexed on optical fiber (725). The other OAAUs in the daisy chain are involved in passing the optical signals onward to DRU 1 (702). DRU 1 (702) DRU 2 and DRU 3 transport the optical signals to and from the network of DRUs in a daisy chain configuration.

Figure 8:
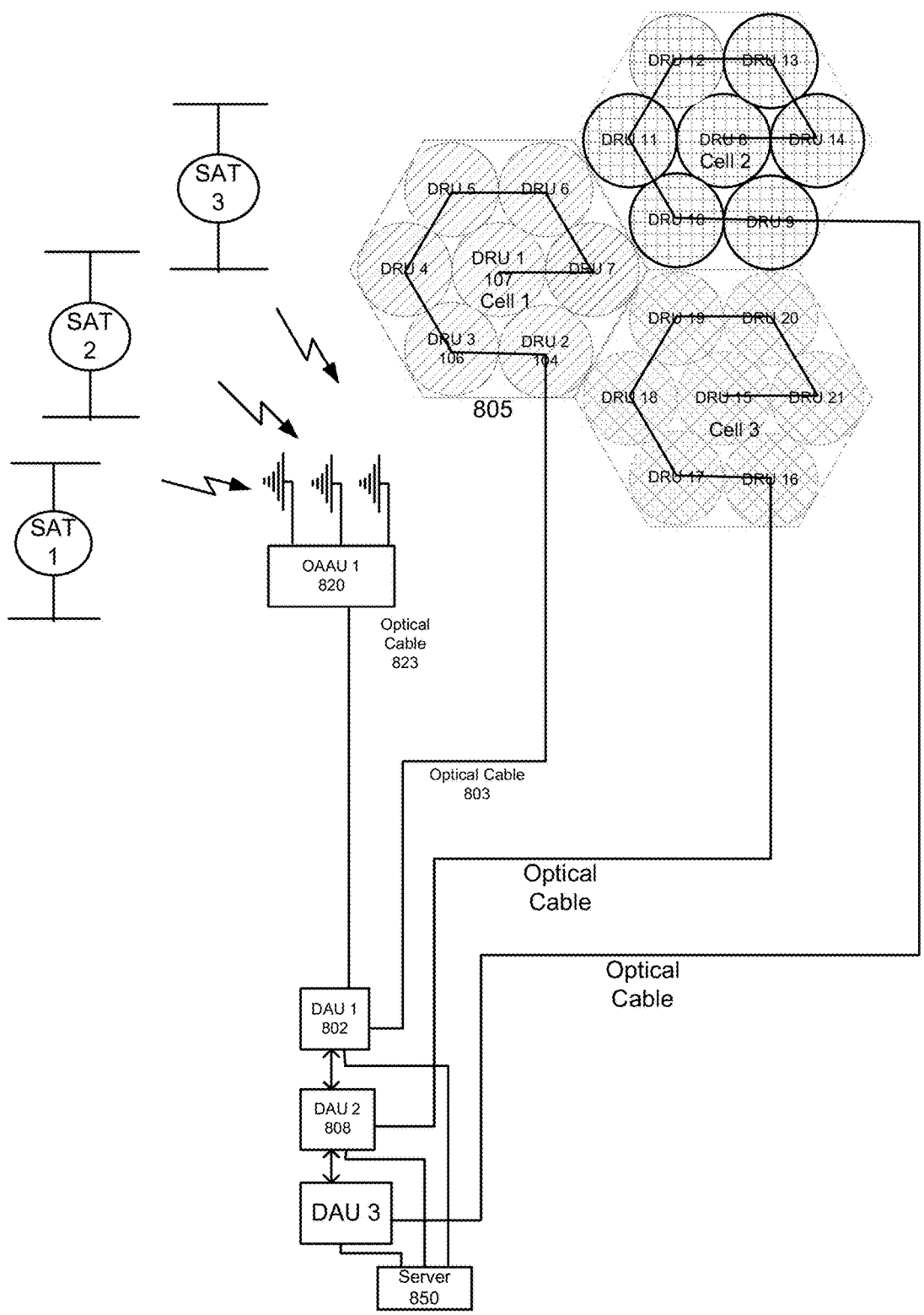
FIG. 8 is a block diagram showing the basic structure and an example of the transport routing based on a single OAAUs with 3 receivers at the local location with multiple DAUs at a local location, and multiple Digital Remote Units (DRUs) at a remote location and optical interfaces to the Remotes according to an embodiment of the present invention.

FIG. 8 is a block diagram showing the basic structure and an example of the transport routing based on a single OAAUs with 3 receivers at the local location with multiple DAUs at a local location, and multiple Digital Remote Units (DRUs) at a remote location and optical interfaces to the Remotes according to an embodiment of the present invention. As shown in FIG. 8, the individual GPS signals from Satellites SAT 1, SAT 2 and SAT 3 are transported to a single OAAU with multiple directional antennas. FIG. 8 demonstrates an architecture in which three independent Satellites are utilized, each Satellite communicating with an independent RF receiver in the OAAU (820). The OAAU (820) time-multiplexes the independent GPS signals to the DAS network as shown in FIG. 8.

Figure 9:
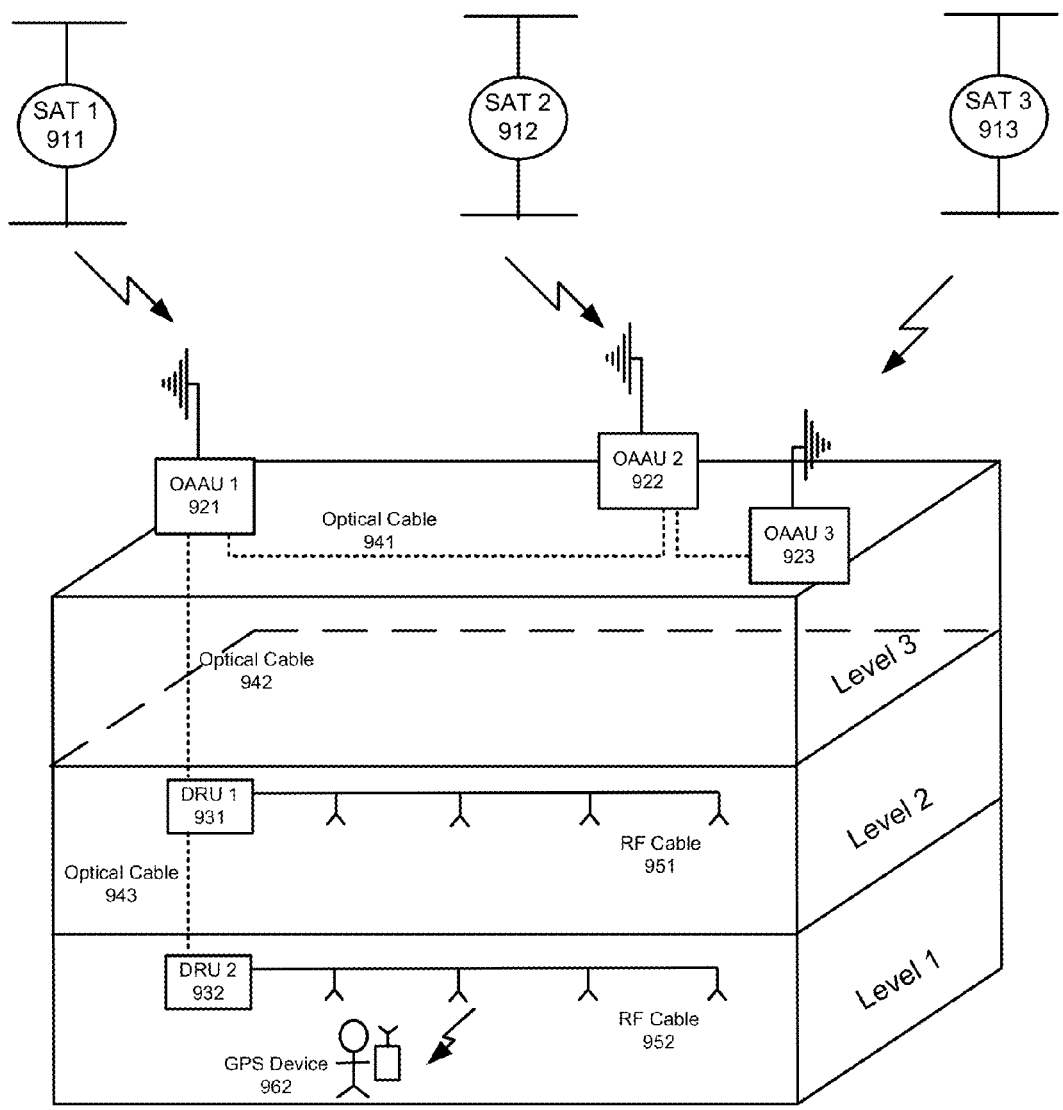
FIG. 9 is a conceptual building layout showing 2 OAAUs receiving the GPS signals from a subset of Satellites and transporting those signals to the Digital Remote Units (DRU) via optical cables according to an embodiment of the present invention. The remote signals at the DRUs are broadcast over the antennas and received by the users GPS receiver in this embodiment.

FIG. 9 is a conceptual building layout showing 2 OAAUs receiving the GPS signals from a subset of Satellites and transporting those signals to the Digital Remote Units (DRU) via optical cables according to an embodiment of the present invention. The remote signals at the DRUs are broadcast over the antennas and received by the users GPS receiver in this embodiment. FIG. 9 shows an embodiment of the system used in a three level building. The present invention is not limited to three levels and can be applied to buildings with additional or fewer levels. The Off-Air Access Units are located on the roof of the building and in line of sight of the Satellites. Directional antennas are used at the OAAUs in order to limit the number of Satellite GPS signals captured by each OAAU. The objective is to separate the Satellite GPS signals at each OAAU. The GPS signals are multiplexed on the optical fiber (941), (942) and transported to DRU 1 (931) and DRU 2 (932). The GPS signals are de-multiplexed at each DRU and combined to create the position at the respective DRU. The signals are broadcast through the RF antennas connected via RF cables to the DRU. GPS Device (962) receives the signal broadcast from DRU 2 (932) that identifies its position.

Figure 10:
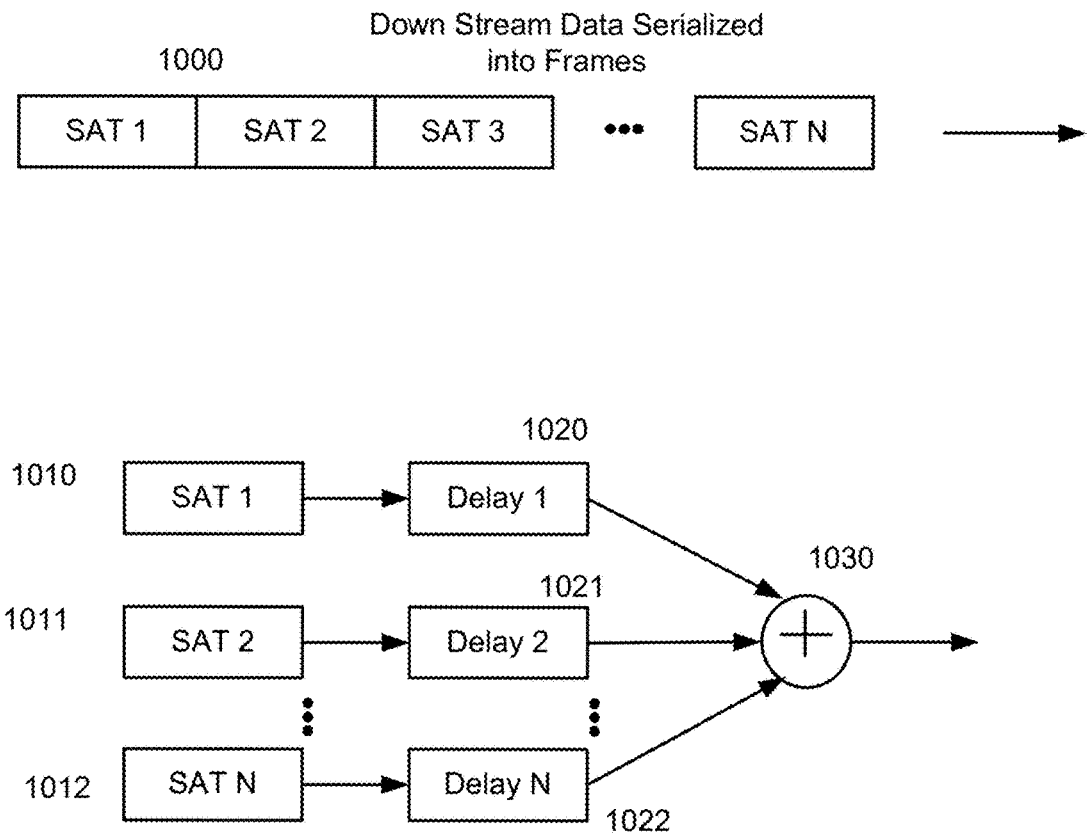
FIG. 10 is a block diagram according to one embodiment of the invention showing the basic structure whereby the OAAU GPS signals on the Frame are time de-multiplexed, delayed relative to one another and then combined according to an embodiment of the present invention.

FIG. 10 is a block diagram according to one embodiment of the invention showing the basic structure whereby the OAAU GPS signals on the Frame are time de-multiplexed, delayed relative to one another and then combined according to an embodiment of the present invention. As shown in FIG. 10, the GPS Satellite down stream data is de-multiplexed and each respective GPS signal is time delayed and summed in order to simulate the position of the DRU. Each DRU transmits the GPS position at the respective DRU. The accuracy of the positional information at the users GPS device is a function of the proximity to the DRU.

Figure 11:
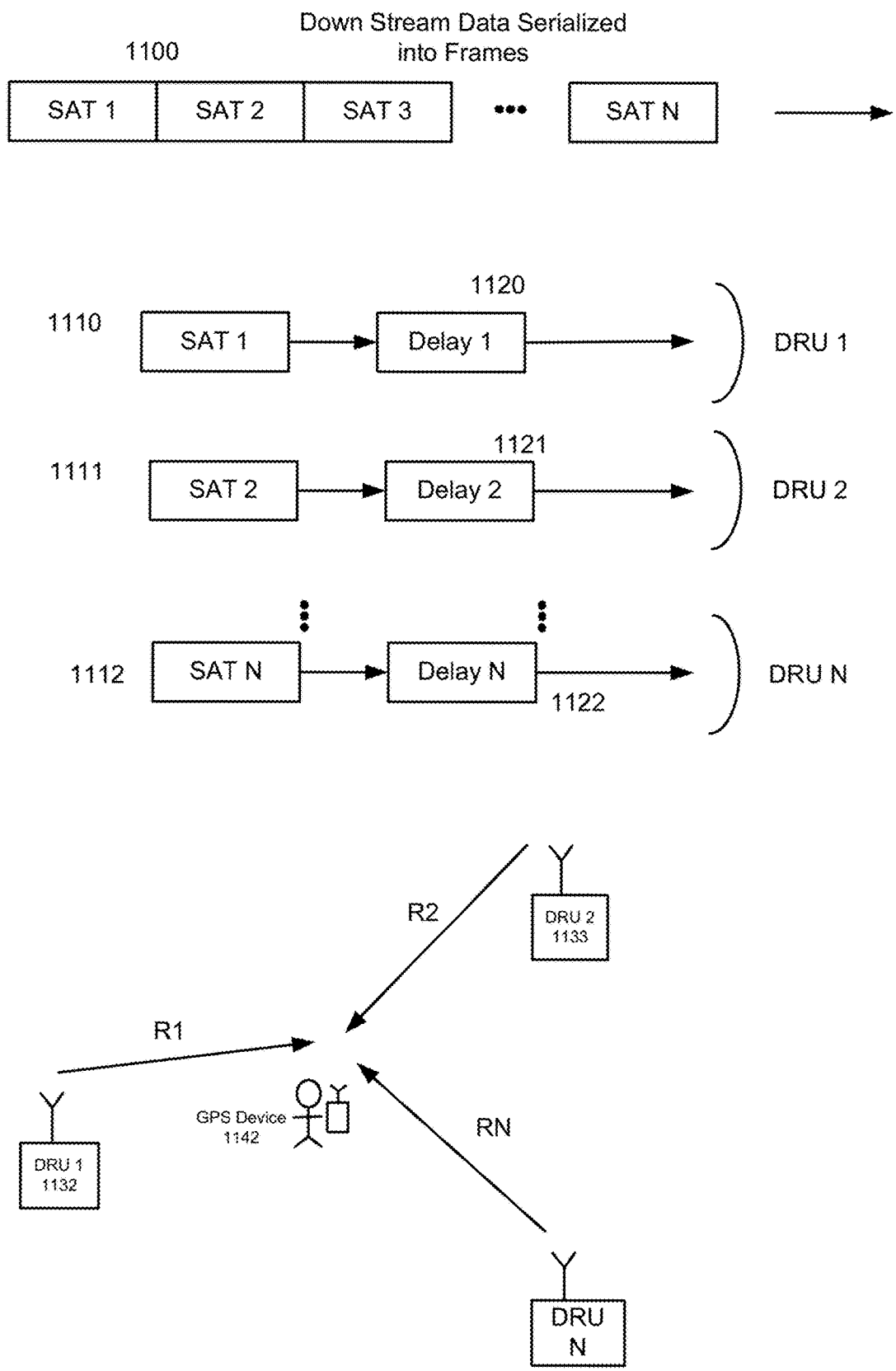
FIG. 11 is a block diagram showing the basic structure whereby one of the OAAU GPS signals on the Frame is time de-multiplexed, delayed and then transmitted at one of more DRUs according to an embodiment of the present invention. The GPS signals for the individual satellites are transmitted on separate DRUs for the objective are replicating the satellite configuration indoors in this embodiment.

FIG. 11 is a block diagram showing the basic structure whereby one of the OAAU GPS signals on the Frame is time de-multiplexed, delayed and then transmitted at one of more DRUs according to an embodiment of the present invention. The GPS signals for the individual satellites are transmitted on separate DRUs for the objective are replicating the satellite configuration indoors in this embodiment. As shown in FIG. 11, the GPS Satellite down stream data is de-multiplexed and each DRU time delays and transmits one or more of the respective GPS signals. This embodiment enables triangulation at the users GPS device by replicating the Satellite signals indoors.

Figure 12:
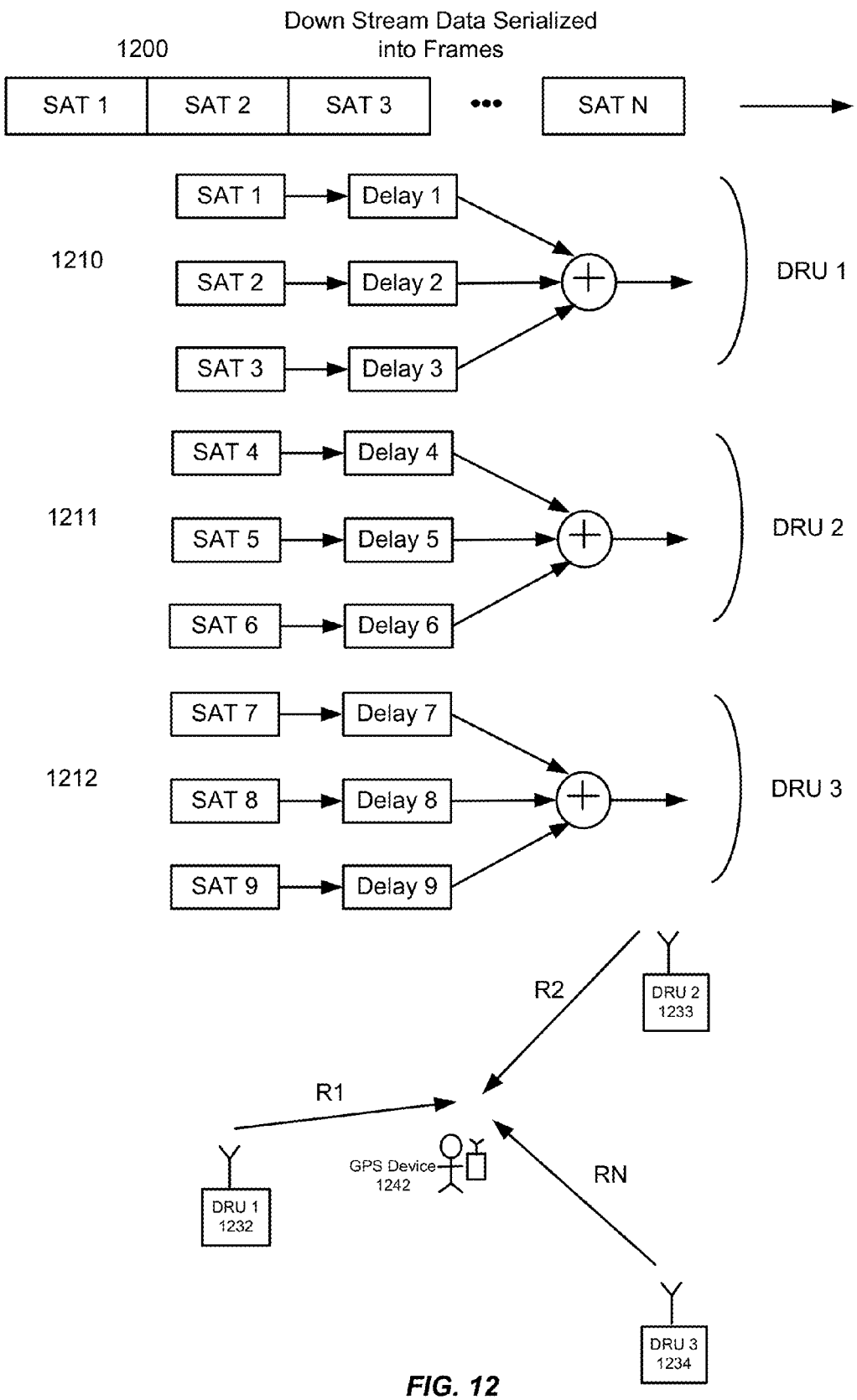
FIG. 12 is a block diagram showing the basic structure whereby the OAAU GPS signals on the Frame are time de-multiplexed, delayed relative to one another and then combined according to an embodiment of the present invention. Each DRU is fed a distinct combination of Satellite GPS signals in this embodiment.

FIG. 12 is a block diagram showing the basic structure whereby the OAAU GPS signals on the Frame are time de-multiplexed, delayed relative to one another and then combined according to an embodiment of the present invention. Each DRU is fed a distinct combination of Satellite GPS signals in this embodiment. As shown in FIG. 12, the GPS Satellite down stream data is de-multiplexed and each DRU time delays and transmits one or more of the respective GPS signals. Each OAAU focuses on a distinct set of satellites. In this embodiment, three distinct satellite GPS signals are received at each of the OAAU and there are three OAAUs. Each DRU transmits a unique set of Satellite GPS signals. This embodiment enables triangulation at the users GPS device by providing three unique GPS locations at the three DRUs. The users GPS device will average the three GPS positions to obtain a more accurate position of the users location.

The position of a GPS receiver is determined by knowing its latitude, longitude and height. Four measurements are typically used to determine the latitude, longitude, height and eliminate the receiver clock error. The GPS receiver has embedded software that has an algebraic model that describes the geometrical position. For each measurement an equation of the distance to the satellite, p, can be written that is a function of the satellite position (x,y,z), the GPS receiver position (X,Y,Z) and the clock error. For simplicity, the clock error has been removed from each equation below, since it is common to all equations.

$$p_{1k} = \sqrt{(X-x_1+\Delta_{1k})^2+(Y-y_1+\Delta_{2k})^2+(Z-z_1+\Delta_{3k})^2}$$

$$p_{2k} = \sqrt{(X-x_2+\Delta_{1k})^2+(Y-y_2+\Delta_{2k})^2+(Z-z_2+\Delta_{3k})^2}$$

$$p_{3k} = \sqrt{(X-x_3+\Delta_{1k})^2+(Y-y_3+\Delta_{2k})^2+(Z-z_3+\Delta_{3k})^2}$$

$$p_{Nk} = \sqrt{(X-x_N+\Delta_{1k})^2+(Y-y_N+\Delta_{2k})^2+(Z-z_N+\Delta_{3k})^2}$$

where (X, Y, Z) is the position of the OAAU and $(x_N, y_N, z_N)$ is the position of Satellite N. and $(\Delta_{1k}, \Delta_{2k}, \Delta_{3k})$ are the calculated positional offsets for DRU k.

The position of DRU k is at $(X+\Delta_{1k}, Y+\Delta_{2k}, Z+\Delta_{3k})$.

The set of four or more equations is solved simultaneously to obtain the values for the OAAU position (X,Y,Z). The Cartesian coordinates can be converted to latitude, longitude, and height in any geodetic datum. In general, a procedure known as the Newton-Raphson iteration is used. In this procedure, each of the equations is expanded into a polynomial based on a initial guesses of the OAAU position. Iteratively the four equations are solved simultaneously. If either one of the height, latitude or longitude is known then only three equations are typically used to resolve for the OAAU position.

The calculated positional offsets, $\Delta$'s, for each DRU can be obtain from the blueprints of the venue and the location of the DRU in the venue. The positional offsets are converted into time delays by dividing by the speed of light. The time delays are applied to signals $(x_1, y_1, z_1)$ as shown in FIG. 10. The resultant signal is transmitted at the DRU and subsequently received by the GPS device.

In some embodiments, the DAU is connected to a host unit/server, whereas the OAAU does not connect to a host unit/server. In these embodiments, parameter changes for the OAAU are received from a DAU, with the central unit that updates and reconfigures the OAAU being part of the DAU, which can be connected to the host unit/server. Embodiments of the present invention are not limited to these embodiments, which are described only for explanatory purposes.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for indoor localization using satellite navigation signals in a Distributed Antenna System, the system comprising:
   one or more Digital Access Units (DAUs);
   a plurality of Off-Air Access Units (OAAUs), each of the plurality of OAAUs operable to receive an individual satellite navigation signal from one of a plurality of satellites and operable to route the individual satellite navigation signals optically to at least one of the one or more DAUs;
   a plurality of remote Digital Remote Units (DRUs) located at a Remote location, wherein each of the plurality of remote DRUs is coupled to at least one of the one or more DAUs and is operable to:
      receive a satellite navigation signal from the at least one of the one or more DAUs;
      delay the received satellite navigation signal; and
      transmit the delayed satellite navigation signal to a mobile device for providing indoor localization of the mobile device using the plurality of DRUs.

2. The system of claim 1 wherein the satellite navigation signal comprises at least one of a GPS, GLONASS, Galileo, QZSS, or BeiDou signal.

3. The system of claim 1 wherein the one or more DAUs are a plurality of DAUs coupled via at least one of a Ethernet cable, Optical Fiber, or Wireless Link.

4. The system of claim 1 wherein the plurality of OAAUs are connected to the one or more DAUs via at least one of Ethernet cable, Optical Fiber, or Wireless Link.

5. The system of claim 1 wherein the delayed satellite navigation signal is a function of a positional offset for each DRU.

6. The system of claim 5 wherein the positional offset is determined during installation using a set of blueprints for a venue.

7. The system of claim 1 further comprising a server coupled to the one or more DAUs.

8. The system of claim 7 wherein the server is operable to route a signal between the remote DRUs.

9. The system of claim 7 wherein the server is operable to store a set of configuration information for the DAUs, the OAAUs, and the DRUs.

10. The system of claim 9 wherein the set of configuration information includes a positional offset for each DRU.

11. The system of claim 1 wherein the one or more DAUs are configured to route a set of parameter changes to the OAAU.

12. The system of claim 1 wherein each of the plurality of OAAUs comprises a directional antenna operable to communicate with a distinct subset of the plurality of satellites.

13. The system of claim 1 wherein:
the OAAU is configured to:
convert the individual satellite navigation signal to a digital satellite navigation signal and route the digital satellite navigation signal through an optical cable to the one or more DAUs;
the one or more DAUs are configured to:
time multiplex the digital satellite navigation signal; and
route the multiplexed digital satellite navigation signal to the at least one of the plurality of remote DRUs; and
the at least one of the plurality of remote DRUs is configured to:
demultiplex the time multiplexed digital satellite navigation signal;
delay the digital satellite navigation signal;
convert the digital satellite navigation signal to an RF satellite navigation signal; and
transmit the RF satellite navigation signal.

14. The system of claim 1 wherein each of the plurality of remote DRUs is operable to transmit a combination of delayed satellite navigation signals.

15. The system of claim 1 wherein each of the plurality of DRUs transmits different delayed satellite navigation signals.

16. A system for indoor localization using GPS signals in a Distributed Antenna System, the system comprising:
one or more Digital Access Units (DAUs);
a plurality of Off-Air Access Units (OAAUs), connected together via a daisy chain configuration, and operable to receive a GPS satellite navigation signal transmitted by at least one of a plurality of GPS satellites, and operable to route the GPS satellite navigation signal optically to at least one of the one or more DAUs;
a plurality of remote Digital Remote Units (DRUs) located at a Remote location, wherein each of the plurality of remote DRUs are operable to:
receive a GPS satellite navigation signal from the at least one of the one or more DAUs;
delay the received GPS satellite navigation signal; and
transmit the delayed GPS satellite navigation signal for providing indoor localization using the plurality of remote DRUs.

17. The system of claim 16 wherein the plurality of OAAUs are coupled via at least one of Ethernet cable, Optical Fiber, or Wireless Link.

18. A system for indoor localization using GPS signals in a Distributed Antenna System, the system comprising:
a plurality of Multiple Input Off-Air Access Units (MIO-AAUs), each receiving a GPS signal from at least one of a plurality of GPS satellites;
at least one Digital Access Unit (DAU) in communication with the plurality of MIOAAUs;
a plurality of remote Digital Remote Units (DRUs), each of the plurality of remote DRUs being operable to:
receive a GPS satellite signal for each of the plurality of MIOAAUs from the at least one DAU;
delay the GPS satellite signal for each of the plurality of MIOAAUs; and
transmit the delayed GPS satellite signal for each of the plurality of MIOAAUs to a mobile device for providing indoor localization of the mobile device using the plurality of DRUs.

19. The system of claim 18 wherein the remote DRUs are located at a Remote location with respect to the plurality of DAUs.

* * * * *